US011433754B2

(12) United States Patent
Laigo et al.

(10) Patent No.: US 11,433,754 B2
(45) Date of Patent: Sep. 6, 2022

(54) HYBRID MODULE HAVING AN ACTUATION UNIT COMPRISING A NEEDLE BEARING, AND HYBRID DRIVE TRAIN

(71) Applicant: Schaeffler Technologies AG & Co. KG, Herzogenaurach (DE)

(72) Inventors: Jonathan Laigo, Karlsruhe (DE); Steffen Lehmann, Ettlingen (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 7 days.

(21) Appl. No.: 16/634,352

(22) PCT Filed: Jul. 3, 2018

(86) PCT No.: PCT/DE2018/100607
§ 371 (c)(1),
(2) Date: Jan. 27, 2020

(87) PCT Pub. No.: WO2019/024956
PCT Pub. Date: Feb. 7, 2019

(65) Prior Publication Data
US 2021/0086605 A1 Mar. 25, 2021

(30) Foreign Application Priority Data

Aug. 2, 2017 (DE) .......................... 102017117511.3
Dec. 14, 2017 (DE) .......................... 102017129873.8

(51) Int. Cl.
*B60K 6/387* (2007.10)
*B60K 6/26* (2007.10)
(Continued)

(52) U.S. Cl.
CPC ................ *B60K 6/387* (2013.01); *B60K 6/26* (2013.01); *F16C 19/361* (2013.01); *F16D 13/52* (2013.01);
(Continued)

(58) Field of Classification Search
CPC .......... F16D 13/52; F16D 13/72; F16D 13/74; F16D 13/70; F16D 21/06; F16D 21/08;
(Continued)

(56) References Cited

U.S. PATENT DOCUMENTS 4,915,204 A * 4/1990 Klotz .................. F16H 63/3026
192/48.91
8,376,112 B2 * 2/2013 Kuwahara ............. F16D 25/083
192/85.53

(Continued)

FOREIGN PATENT DOCUMENTS

DE        4311697 A1   10/1994
DE   102012206292 A1   11/2012
(Continued)

OTHER PUBLICATIONS

Source: https://www.skf.com/binaries/pub12/Images/0901d196803e7d9e-Catalogue---Needle-roller-bearings-06003-EN_tcm_12-271146.pdf; p. 152-154 Title: Needle roller bearings Date: Apr. 30, 2016.

*Primary Examiner* — David R Morris
*Assistant Examiner* — Farhana Pervin

(57) ABSTRACT

A hybrid module for a drive train of a motor vehicle comprises a housing, a disconnect clutch, and a hydraulic actuating unit cooperating with the disconnect clutch and received on the housing. The module includes an electric motor, wherein a rotor of the electric motor is rotationally coupled to a clutch component of the disconnect clutch. The actuating unit has a piston element, which is received such that it is displaceable relative to the housing and which, via an actuating bearing, is connected to a pressure element such that it is fixed against displacement in an axial direction of the disconnect clutch yet rotatable relative to the pressure element. The pressure element is configured for engagement (Continued)

and disengagement of the disconnect clutch, and the actuating bearing is formed as an axial needle bearing.

12 Claims, 2 Drawing Sheets

(51) Int. Cl.
  *F16C 19/36* (2006.01)
  *F16D 13/52* (2006.01)
  *F16D 13/72* (2006.01)
  *F16D 21/06* (2006.01)
  *F16D 25/0638* (2006.01)
  *B60K 6/48* (2007.10)
  *F16D 25/08* (2006.01)

(52) U.S. Cl.
  CPC ............ *F16D 13/72* (2013.01); *F16D 21/06* (2013.01); *F16D 25/0638* (2013.01); *B60K 6/48* (2013.01); *F16C 2361/43* (2013.01); *F16D 25/08* (2013.01); *F16D 2021/0653* (2013.01); *F16D 2021/0661* (2013.01)

(58) Field of Classification Search
  CPC ..... F16D 2021/0661; F16D 2021/0692; F16D 2021/0653; F16D 25/08; F16D 25/06; F16D 25/10; F16D 25/123; F16D 67/02; F16D 67/04; B60K 6/48; B60K 6/442; B60K 6/485; B60K 6/4816; B60K 6/38; B60K 6/26; B60K 6/387
  See application file for complete search history.

(56) References Cited

U.S. PATENT DOCUMENTS

| | | | |
|---|---|---|---|
| 8,747,279 B2* | 6/2014 | Furuichi | ............. F16D 25/0638 477/5 |
| 9,062,721 B2* | 6/2015 | Akahane | ............... F16H 57/027 |
| 9,193,255 B2* | 11/2015 | Arnold | ..................... B60K 6/48 |
| 2010/0282560 A1 | 11/2010 | Voegtle et al. | |

FOREIGN PATENT DOCUMENTS

| | | |
|---|---|---|
| DE | 102014218878 B3 | 2/2016 |
| DE | 102014014669 A1 | 4/2016 |
| DE | 102016219234 A1 | 5/2017 |
| DE | 102015224516 A1 | 6/2017 |
| DE | 102015224903 A1 | 6/2017 |
| DE | 102016221948 A1 | 6/2017 |
| EP | 2789870 A1 | 10/2014 |
| FR | 2301731 A1 | 9/1976 |
| WO | 2010127663 A1 | 11/2010 |
| WO | 2018130236 A1 | 7/2018 |

* cited by examiner

HYBRID MODULE HAVING AN ACTUATION UNIT COMPRISING A NEEDLE BEARING, AND HYBRID DRIVE TRAIN

CROSS-REFERENCE TO RELATED APPLICATIONS

This application is the U.S. National Phase of PCT Appln. No. PCT/DE2018/100607 filed Jul. 3, 2018, which claims priority to DE 10 2017 117 511.3 filed Aug. 2, 2017 and DE 10 2017 129 873.8 filed Dec. 14, 2017, the entire disclosures of which are incorporated by reference herein.

TECHNICAL FIELD

The disclosure relates to a hybrid module for a (hybrid) drive train of a motor vehicle, such as a car, truck, bus or other commercial vehicle, having a housing, a disconnect clutch, a hydraulic actuating unit, cooperating with the disconnect clutch and received on the housing, and an electric motor, wherein a rotor of the electric motor is rotationally coupled (e.g., fastened) or can be rotationally coupled to a clutch component of the disconnect clutch, and wherein the actuating unit has a piston element, which is received such that it is displaceable relative to the housing and which, by means of an actuating bearing, is connected/coupled to a pressure element such that it is fixed against displacement in an axial direction of the disconnect clutch yet rotatable relative to said pressure element, which pressure element serves for the engagement and disengagement of the disconnect clutch. The disclosure moreover relates to a (hybrid) drive train for a motor vehicle having this hybrid module.

BACKGROUND

The generic prior art is already sufficiently known. For example, WO 2010/127 663 A1 discloses a dual clutch transmission having a wet dual clutch, dual mass flywheel and centrifugal pendulum and having an e-motor connected to the primary side of the dual mass flywheel.

However, the hybrid modules known from the prior art often have the disadvantage that they are designed with a relatively large structure—in particular in the axial direction. The consequence of this is, in turn, that the hybrid modules cannot be easily used in all known drive trains with varying dimensions. If these hybrid modules are to be used for different applications, it is necessary to carry out hitherto relatively complex adaptations to the peripheral components of the drive train, which is associated with relatively high development effort and costs.

SUMMARY

It is therefore the object of the present disclosure to eliminate the disadvantages known from the prior art and, in particular, to provide a hybrid module which, in terms of its installation space, is formed such that it is compact enough to be accessible for further applications.

This is achieved according to the disclosure in that the actuating bearing is formed as an axial needle bearing.

Using a needle bearing for the actuating bearing saves on considerable installation space, in particular in the axial direction. The hybrid module is consequently accessible for further applications and can be easily adapted into existing drive trains.

Further advantageous embodiments are explained in more detail below.

The hydraulic actuating unit/clutch actuating device preferably has a (concentric) slave cylinder (also referred to as CSC, clutch slave cylinder, and concentric slave cylinder) or is formed as such, whereby the piston element is also preferably annular in form and arranged concentric to a rotary axis of the hybrid module/disconnect clutch. The slave cylinder typically serves for engaging and/or disengaging the disconnect clutch, in particular a friction clutch. The actuating unit of the disconnect clutch is thus integrated in a particularly compact manner.

It is also advantageous if the needle bearing has a cage supporting/holding a plurality of needle bodies of the needle bearing relative to one another (in a circumferential direction), wherein the cage is supported/held such that it is centered relative to the piston element (and therefore relative to the rotary axis of the disconnect clutch). The piston element is preferably in turn supported such that it is centered (with respect to the rotary axis) on the housing.

In this connection, it is furthermore advantageous if the piston element is formed in such a way that the pressure element is nested in the piston element/projects into the piston element, at least partially in the axial direction. It has proven particularly expedient in this case if the piston element has a receiving space which is formed in a C shape, as seen in longitudinal section of the hybrid module (i.e. the receiving space is enclosed by the C and is annular as a whole), wherein the needle bearing and/or at least part of the pressure element is/are arranged in the axial direction in this receiving space. It is thus possible to easily save on further installation space.

If a cylinder region of the actuating unit, which bears/receives the piston element, is formed directly by the housing/integrally with the housing, the installation space requirement is further optimized.

In this regard, it is further advantageous if the actuating unit is received/arranged in an intermediate wall of the housing which extends in the radial direction.

It is possible to save on additional installation space if a hydraulic pressure chamber, which is enclosed by the cylinder region and the piston element, is connected to a hydraulic line by means of at least one bore incorporated/arranged in the housing.

The functionality of the actuating unit is additionally improved if the piston element is pre-tensioned in its retracted position by means of a resetting spring (preferably in the form of a disk spring) supported on the pressure element.

The disconnect clutch is integrated particularly cleverly in the hybrid module if the clutch component of the disconnect clutch which is (or can be) rotationally coupled to the rotor has a rotor carrier which is rotatably mounted by means of a supporting bearing (in the form of a ball bearing) on the housing.

In this connection, it is moreover advantageous if a first screw element, screwed to the clutch component of the disconnect clutch, serves as a counter-holder for a plurality of friction elements of the disconnect clutch and axially supports a first bearing ring of the supporting bearing, and/or a second screw element, screwed to the housing, is arranged for axially securing a second bearing ring of the supporting bearing. The supporting bearing is thus fastened particularly robustly in the axial direction. The first bearing ring is then typically connected in a torque-proof manner to the clutch component of the disconnect clutch which receives the rotor and the second bearing ring is received in a fixed manner on the housing.

Two sub-clutches (together forming a dual clutch) are preferably additionally present in addition to the disconnect clutch, wherein each of the clutches present (i.e. the disconnect clutch as well as a first sub-clutch and a second sub-clutch) is formed to be oil-cooled.

A first sub-clutch and/or a second sub-clutch is/are further preferably actuated via a rotary transmission leadthrough. This saves on further installation space.

In addition to the supporting bearing, two supporting needle bearings are furthermore present, which support the rotating components, i.e. in particular the clutch component of the disconnect clutch which receives the rotor and clutch components of the first and second sub-clutch, in the radial direction. In this case, the supporting bearing is designed in such a way that it serves both as a radial and as an axial bearing. The supporting needle bearings primarily serve for the radial support/radial bearing of the rotor carrier/the respective clutch component with respect to a transmission shaft of a transmission. Clever support of the individual elements is thus realized.

The disconnect clutch and/or the two sub-clutches are preferably formed to be wet-running/wet (preferably as a wet-running/wet triple clutch) or further preferably dry/dry-running (preferably as a dry-running/dry triple clutch). If the disconnect clutch and the two sub-clutches are designed as dry-running clutches, the needle bearing is further preferably greased and sealed.

It shall also be pointed out that the hybrid module does not necessarily have to be equipped with a coaxial electric motor/e-motor. Instead, in further embodiments of the hybrid module according to the disclosure, the electric motor (preferably in a 48V or high-voltage embodiment) can also be arranged axially parallel. This is because the rotor is arranged (with its rotary axis) parallel to the rotary axis of the disconnect clutch and is typically rotationally connected to the clutch component of the disconnect clutch indirectly (e.g. via a traction mechanism).

The disclosure moreover relates to a (hybrid) drive train for a motor vehicle having an inventive hybrid module according to at least one of the embodiments described above.

In other words, according to the disclosure, a particularly installation-space-saving P2 hybrid module is implemented with a needle-bearing CSC (actuating unit with needle bearing). The parallel-type hybrid module comprises a disconnect clutch and a concentric slave cylinder (actuating unit) for actuating the disconnect clutch. The disconnect clutch comprises an axial bearing which is formed by a needle bearing.

BRIEF DESCRIPTION OF THE DRAWINGS

The disclosure will now be explained in more detail below with the aid of figures.

The figures show.

The figures are merely schematic in nature and serve solely for an understanding of the disclosure. The same elements are denoted by the same reference signs.

DETAILED DESCRIPTION

Figure 1:
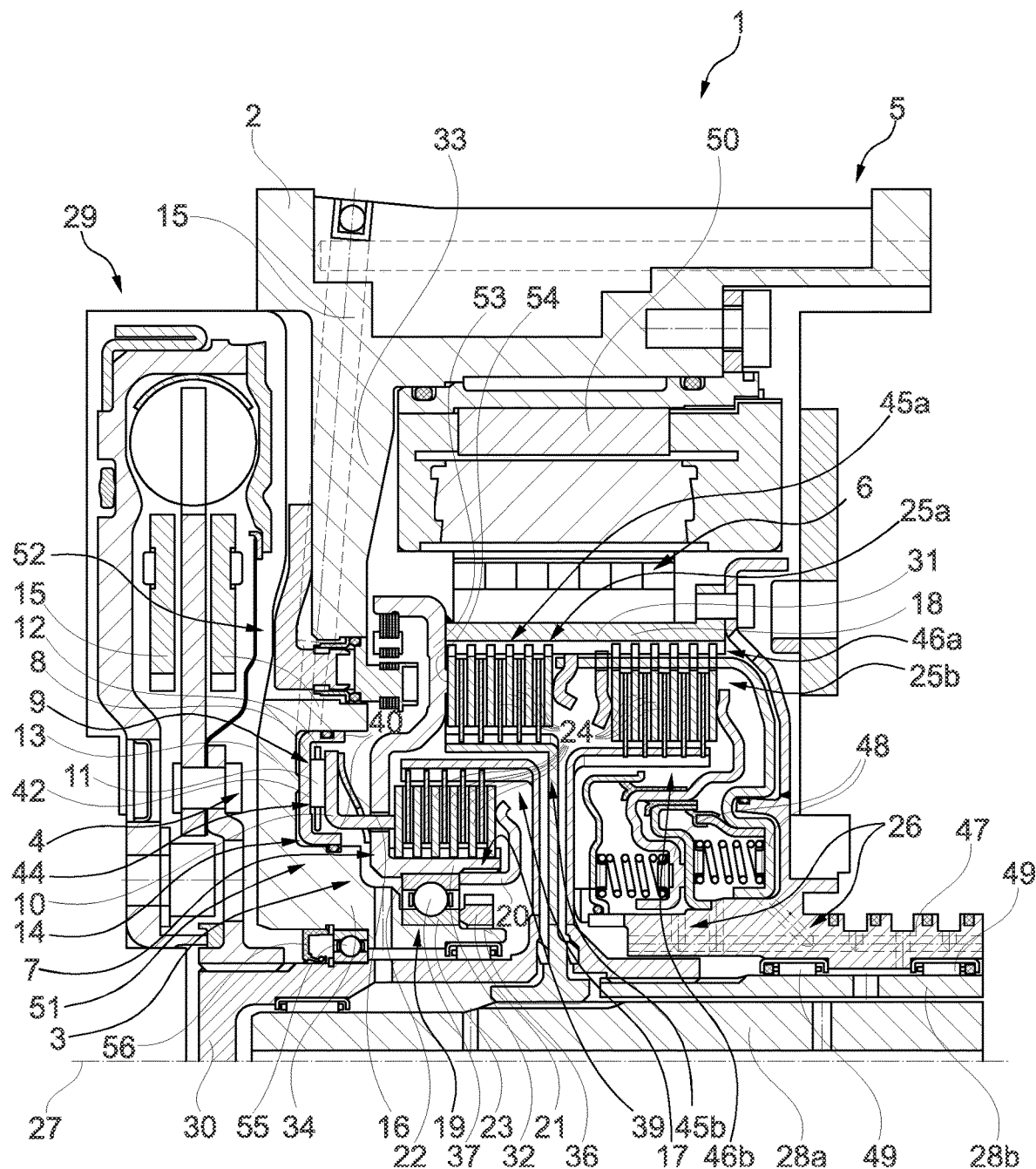
FIG. 1 a longitudinal sectional illustration of an inventive hybrid module according to an exemplary embodiment, wherein a disconnect clutch formed as a friction clutch (multi-plate friction clutch) and two sub-clutches formed as a dual clutch, which are likewise formed as a friction clutch (multi-plate friction clutch) and are each coupled to a rotor of an electric motor, are shown in terms of their basic structure.

FIG. 1 shows the basic structure of an inventive hybrid module 1/hybrid drive module designed according to an exemplary embodiment. In operation, the hybrid module 1 is typically part of a hybrid drive train (not illustrated further here for the sake of clarity) of a motor vehicle. Amongst other things, an internal combustion engine (likewise not illustrated further here for the sake of clarity) and a transmission are part of this drive train. The transmission is indicated by two transmission shafts 28a, 28b, shown in sections, in the form of transmission input shafts. As is conventional, the hybrid module 1 is arranged between an output shaft of the internal combustion engine and the transmission shafts 28a, 28b, as seen along a torque transmission path. The transmission shafts 28a, 28b therefore form driven shafts of the hybrid module 1.

The hybrid module 1 is formed as a clutch device and has a plurality of clutches (disconnect clutch 3 and sub-clutches 25a, 25b), which are used for switching various operating states. Depending on the respective operating state of the hybrid module 1, a torque is transmitted from the internal combustion engine to one of the two transmission shafts 28a, 28b and/or to the electric motor 5 and/or a torque is transmitted from the electric motor 5 to one of the two transmission shafts 28a, 28b and/or to the output shaft of the internal combustion engine.

In FIG. 1, a torsional-vibration damping unit 29 in the form of a dual mass flywheel is arranged on the hybrid module 1 on the input side, wherein this torsional-vibration damping unit 29 can be seen as part of the hybrid module 1 or as detached from the hybrid module 1. The torsional-vibration damping unit 29 is in turn connected in a torque-proof manner by its input to the output shaft of the internal combustion engine during operation and in a torque-proof manner by its output to a shaft 30/drive shaft/drive flange of the hybrid module 1.

The shaft 30 is furthermore connected in a torque-proof manner to a (second) clutch component 17 of the disconnect clutch 3. To this end, the second clutch component 17 of the disconnect clutch 3 has a plate carrier (outer plate carrier) connected in a torque-proof manner to the shaft 30 and a plurality of friction elements 24, which are displaceable relative to one another on this plate carrier in an axial direction (i.e. along a rotary axis 27 of the hybrid module 1/disconnect clutch 3). The friction elements 24 of the second clutch component 17 are arranged alternately with friction elements 24 of a further (first) clutch component 7 of the disconnect clutch 3 in the axial direction. The first clutch component 7 therefore also has a plurality of friction elements 24 which, in the coupled position of the disconnect clutch 3, are typically pressed with friction fit against the friction elements 24 of the second clutch component 17 and, in a decoupled position of the disconnect clutch 3, are arranged such that they are freely rotatable relative to the friction elements 24 of the second clutch component 17. The first clutch component 7 of the disconnect clutch 3 also has a supporting region 32, which in turn receives the friction elements 24 in a torque-proof manner and such that they are axially displaceable relative to one another. The supporting region 32 of the disconnect clutch 3 is designed as an integral component of a rotor carrier 18.

The rotor carrier 18 has, radially outside the supporting region 32, a sleeve region 31 on which a rotor 6 of an electric motor 5 is received in a torque-proof manner. The electric motor 5 is typically integrated in a housing 2 of the hybrid module 1. A stator 50 of the electric motor 5 is received in a fixed manner in the housing 2 and the rotor 6 is mounted such that it is rotatable relative to the stator 50.

The bearing of the rotor 6 relative to the housing 2 takes place via the rotor carrier 18, namely via a supporting bearing 19 arranged on the rotor carrier 18 and designed as a ball bearing. The supporting bearing 19 is moreover received on an intermediate wall 33 of the housing 2, which extends inward in the radial direction. To this end, the intermediate wall 33 has, on its radially inner side, a cup-shaped region 34 in which the supporting bearing 19 is received. In particular, a (second) two-part bearing ring 23 of the supporting bearing 19 is fastened in a stationary manner on the housing 2/cup-shaped region 34. For this purpose, the (second) bearing ring 23 is fastened axially between a radial (first) shoulder 35 (FIG. 2) of the housing 2 and a (second) screw element 21, which is screwed in a fixed manner to the cup-shaped region 34. The second screw element 21 is formed as a screw ring and screwed by an internal thread 36 to a corresponding thread (external thread) of the cup-shaped region 34. A further (first) bearing ring 22 of the supporting bearing 19, which is mounted in rolling bearings relative to the second two-part bearing ring 23 via rolling bodies 37 in the form of balls, is fastened to the first clutch component 7/the rotor carrier 18, namely in the supporting region 32. Provided on the rotor carrier 18 for this purpose are a (first) screw element 20 and a (second) shoulder 38 (FIG. 2), also formed directly on the rotor carrier 18, between which the first bearing ring 22 is fastened in the axial direction. The first screw element 20 is substantially annular in form and has an external thread 39 by which it is screwed to a corresponding thread (internal thread) on the rotor carrier 18. The first screw element 20 moreover extends outward from this external thread 39 in the axial direction so that it covers the friction elements 24 of the disconnect clutch 3 laterally, as seen in the axial direction, and as a counter-supporting element/counter-pressure plate for these friction elements 24.

The shaft 30 is rotatably mounted on the housing 2 via a bearing 55 formed as a ball bearing. A radial shaft sealing ring 56 serves for sealing an interior space of the housing 2, which is filled with oil during operation and comprises the clutches 3, 25a and 25b.

Figure 2:
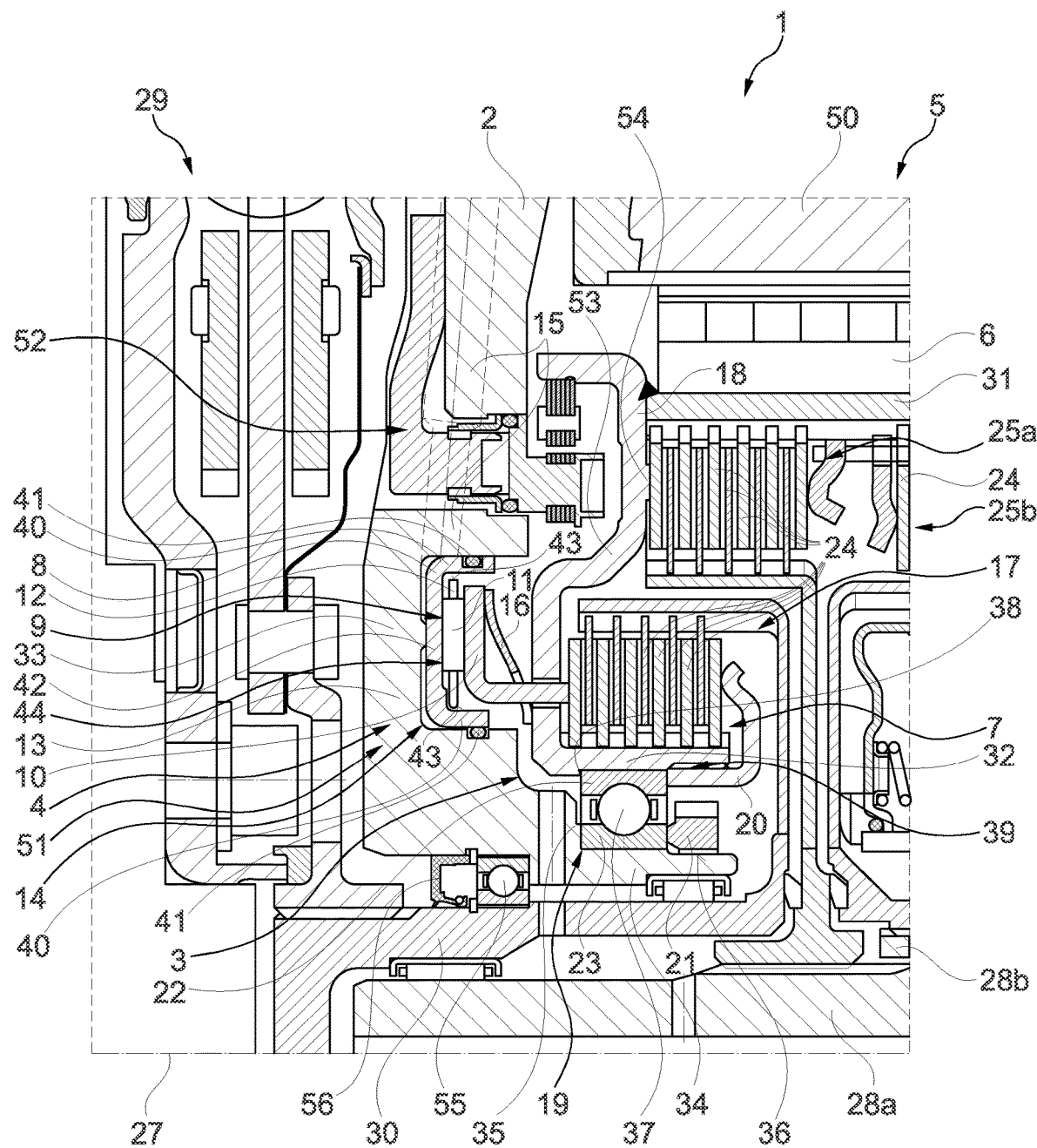
FIG. 2 a detailed illustration of the hybrid module according to FIG. 1 in the region of an actuating unit which is integrated in a housing and acts on the disconnect clutch in an actuating manner during operation.

An actuating unit 4 for the disconnect clutch 3 is shown particularly clearly in FIG. 2. The actuating unit 4 is implemented as a hydraulic actuating unit 4. The actuating unit 4 has a concentric slave cylinder 51. The slave cylinder 51 accordingly has an annular piston element 8, which is received on the housing 2 such that it is displaceable in the axial direction. A cylinder region 13 displaceably guiding the piston element 8 in the axial direction is formed as an integral component of the housing 2, namely the intermediate wall 33. The piston element 8 is formed in a C shape, as seen in the longitudinal section according to FIG. 2. Lateral regions 40/lateral strips of the piston element 8, which are arranged radially inward and outward, extend in the axial direction and form the lateral arms of the C, are displaceably guided toward the radial inner or outer side on the housing 2. Seals 41 (FIG. 2) are used to seal a pressure chamber 14 enclosed by the piston element 8 and the cylinder region 13 from the environment.

The pressure chamber 14 is connected to a bore 15, which is incorporated in the housing 2. In operation, the pressure chamber 14 is connected via the bore 15 to a hydraulic line connecting the slave cylinder 51 to a master cylinder.

As can likewise clearly be seen in FIG. 2, the piston element 8, according to the disclosure, is non-displaceably connected by means of an actuating bearing 9, formed as a needle bearing, to a pressure element 10 which is in turn non-displaceably coupled to one of the friction elements 24 of the disconnect clutch 3. As seen in the axial direction, the needle bearing 9 designed as an axial bearing is arranged between a web 42 of the piston element 8—which web is aligned in the radial direction—and the pressure element 10. The web 42 is that region of the piston element 8 which extends in the radial direction and connects the two lateral regions 40 to one another. The pressure element 10 has a substantially L-shaped configuration, as seen in longitudinal section. The needle bearing 9 is seen as a component of the actuating unit 4/slave cylinder 51.

A first bearing ring of the needle bearing 9 is formed directly by the web 42; a second bearing ring of the needle bearing 9 is formed directly by the pressure element 10. Consequently, a plurality of rolling bodies, denoted as needle bodies 11, of the needle bearing 9 are arranged in the axial direction between the pressure element 10 and the web 42, wherein it goes without saying that each needle body 11 is aligned with its longitudinal axis in the radial direction of the disconnect clutch 3. A spacing between the needle bodies 11 in the circumferential direction defines a cage 12 of the needle bearing 9. The needle bearing 9 is therefore formed as a cage-guided needle bearing.

The cage 12 of the needle bearing 9 is moreover dimensioned in such a way that, at its radial outer and inner side, it is centered relative to the piston element 8 and therefore in turn relative to the housing 2/axis of rotation 27. The respective outer and inner side of the cage 12 serves as a centering surface 43/guide surface/slide surface (FIG. 2), which is in sliding contact with the lateral regions 40 or can be brought into sliding contact therewith.

The needle bearing 9 is moreover formed in a compact manner such that, in the axial direction, it is received completely in the receiving space 44 which is delimited in the radial direction by the two lateral regions 40 (and is open axially toward a side facing away from the web 42). The pressure element 10 is also partially arranged in this receiving space 44 in the axial direction.

The pressure element 10 is furthermore axially pre-tensioned by a resetting spring 16 in the form of a disk spring. The resetting spring 16 is therefore clamped between the pressure element 10 and the rotor carrier 18 such that it pre-tensions the pressure element 10 toward a position corresponding to the decoupled position of the disconnect clutch 3. This corresponds to a retracted position of the actuating unit 4/piston element 8, as illustrated in FIG. 2.

Returning to FIG. 1, the further structure of the two sub-clutches 25a and 25b can be seen. A first sub-clutch 25a and a second sub-clutch 25b are formed and function substantially according to the disconnect clutch 3. The first sub-clutch 25a is likewise mounted in a torque-proof manner with its first clutch component 45a on the rotor carrier 18. In this case, the first clutch component 45a is also formed directly by the sleeve region 31. Friction elements 24 of the first clutch component 45a are received in a torque-proof manner on a radial inner side of the sleeve region 31 such that they are axially displaceable relative to one another. A second clutch component 45b of the first sub-clutch 25a is connected in a torque-proof manner to a first transmission shaft 28a of the transmission. The second clutch component 45b also typically has friction elements 24, which alternate with the friction elements 24 of the first clutch component 45a in the axial direction. The rotor carrier 18 has, on its flange region 53 (that region which connects the supporting region 32 to the sleeve region 31), a supporting contour 54 in the form of an elevation, which axially supports the friction elements 24 in the coupled position of the first sub-clutch 25a.

The second sub-clutch 25b is constructed substantially according to the first sub-clutch 25a and arranged adjacent to the first sub-clutch 25a in the axial direction. The first clutch component 46a of the second sub-clutch 25b is also a torque-proof component of the rotor carrier 18, whereas the second clutch component 46b of the second sub-clutch 25b is coupled in a torque-proof manner to a second transmission shaft 28b.

The first sub-clutch 25a and the second sub-clutch 25b are oil-cooled, as is the disconnect clutch 3.

The first and second sub-clutches 25a, 25b, which together form a dual clutch, are each actuated by means of a rotary transmission leadthrough 26. For this, a corresponding hydraulic line system is implemented in a guide element 47 which is fixedly connected to the rotor carrier 18. The rotary transmission leadthroughs 26 are each operatively connected to an actuating piston 48 (FIG. 1), which actuates the respective sub-clutch 25a, 25b between their coupled and decoupled position. Moreover, the rotary guides 26 also serve for oiling sub-clutches 25a, 25b.

As can furthermore be seen in FIG. 1, the guide element 47 is supported on the second shaft 28b in the radial direction via further supporting bearings in the form of supporting needle bearings 49. The two supporting needle bearings 49 are arranged spaced in the axial direction and serve for radially supporting the rotor carrier 18 (and thus for radially supporting the respective clutch component 7, 45a and 46a of the clutches 3, 25a and 25b). The axial forces of these clutches 3, 25a and 25b, on the other hand, are mainly absorbed by the supporting bearing 19.

A rotor bearing sensor 52 is moreover present for determining the rotary position of the rotor 6 (via the rotor carrier 18) during operation.

In other words, a P2 hybrid drive module (hybrid module 1; FIG. 1) is implemented with an integrated oil-cooled dual clutch ((first) sub-clutch K1 25a and (second) sub-clutch K2 25b) and a sub-clutch K0 3, also oil-cooled. The two clutches K1 and K2 are actuated by means of rotary transmission leadthroughs 26. The actuation of K0 3 takes place by means of a CSC 51 with an axial needle bearing 9, which, in the present arrangement, is advantageous in terms of the installation space required for the K0 actuating unit 14. This is therefore advantageous in terms of the overall installation space of the P2 hybrid module 1. The CSC (slave cylinder 51) with the needle bearing 9 mainly supports the axial forces of the CSC piston (piston element 8) in order to actuate the K0. The majority of the axial actuating forces of all clutches K0, K1 and K2 are supported by the supporting bearing 19, whereas the radial forces of the rotor (rotor 6 with the rotor carrier 18 including the flange region 53) are supported via the bearings in the form of the supporting bearing 19 and the supporting needle bearing 49. The radial residual forces can be optionally supported via the centering of the cage 12 of the axial needle bearing 9 on the CSC piston 8. The disk spring 16 serves as a resetting element of the CSC piston 8.

The bore 15 in the housing 2 guides the oil from the actuator system to the sealed CSC pressure chamber 14 so that the K0 disconnect clutch 3 can be actuated. A supporting screw (first screw element 20) and a further screw (second screw element 21) support the actuating forces of the K0 and, at the same time, fix the supporting bearing 19 axially. In this case, the supporting screws 20, 21 are screwed into the rotor flange 53 (supporting region 32) or to the housing stub (cup-shaped region 34) via an external or internal thread (36, 39). The radial and axial bearing of the rotor 6 together with the three clutch units 3, 25a, 25b therefore takes place by means of a supporting bearing 19, via the rotor flange 53 on the housing intermediate wall 33, and by means of the (radial) needle bearing (supporting needle bearing 49) on the driven shaft 28b of the sub-clutch K2, via a rotary transmission leadthrough 26 of the K1 and K2.

The entire section of the hybrid drive module 1 with the inventive arrangement of the axial needle bearing 9 in the K0 slave cylinder 51 is shown in FIG. 1. The actuating unit of the K1 and K2 as the rotary transmission leadthrough 26 and the oiling of the K0 and the bearing of the rotor 6, together with the clutch unit, can also be seen. FIG. 2 shows a detailed structural design of the axial needle bearing 9 in K0-CSC 51.

LIST OF REFERENCE NUMBERS

1 Hybrid module
2 Housing
3 Disconnect clutch
4 Actuating unit
5 Electric motor
6 Rotor
7 First clutch component of the disconnect clutch
8 Piston element
9 Actuating bearing
10 Pressure element
11 Needle body
12 Cage
13 Cylinder region
14 Pressure chamber
15 Bore
16 Resetting spring
17 Second clutch component of the disconnect clutch
18 Rotor carrier
19 Supporting bearing
20 First screw element
21 Second screw element
22 First bearing ring of the supporting bearing
23 Second two-part bearing ring of the supporting bearing
24 Friction element
25a First friction clutch
25b Second friction clutch
26 Rotary transmission leadthrough
27 Rotary axis
28a First transmission shaft
28b Second transmission shaft
29 Torsional-vibration damping unit
30 Shaft/flanged shaft
31 Sleeve region
32 Supporting region
33 Intermediate wall
34 Cup-shaped region
35 Shoulder
36 Internal thread
37 Rolling body
38 Shoulder 39 External thread
40 Lateral edge
41 Seal
42 Web
43 Centering surface
44 Receiving space
45a First clutch component of the first sub-clutch
45b Second clutch component of the first sub-clutch
46a First clutch component of the second sub-clutch
46b Second clutch component of the second sub-clutch
47 Guide element
48 Actuating piston
49 Supporting needle bearing
50 Stator
51 Slave cylinder
52 Rotor position sensor
53 Flange region
54 Supporting contour
55 Bearing
56 Radial shaft sealing ring

The invention claimed is:

1. A hybrid module for a drive train of a motor vehicle, comprising: a housing, a disconnect clutch having a plurality of inner friction elements and a plurality of outer friction elements, a hydraulic actuating unit, cooperating with the disconnect clutch and received on the housing, and an electric motor, wherein a rotor of the electric motor includes a rotor carrier integrally formed with a clutch component of the disconnect clutch that supports the plurality of inner friction elements, wherein the actuating unit has a piston element, which is received such that it is displaceable relative to the housing and which, via an actuating bearing, is connected to a pressure element such that it is fixed against displacement in an axial direction of the disconnect clutch yet rotatable relative to the pressure element, wherein the pressure element is configured for engagement and disengagement of the disconnect clutch, wherein the rotor carrier is rotatably mounted by a supporting bearing on the housing, and wherein a first screw element, screwed to the clutch component of the disconnect clutch, serves as a counter-holder for the friction elements of the disconnect clutch and axially supports a first bearing ring of the supporting bearing, and a second screw element, screwed to the housing, is arranged for axially securing a second bearing ring of the supporting bearing.

2. The hybrid module as claimed in claim 1, wherein the actuating bearing is a needle bearing having a cage holding a plurality of needle bodies of the needle bearing at a relative spacing from one another, wherein the cage is centered relative to the piston element.

3. The hybrid module as claimed in claim 1, wherein a cylinder region of the actuating unit, which receives the piston element, is formed directly by the housing.

4. The hybrid module as claimed in claim 3, wherein a hydraulic pressure chamber, which is enclosed by the cylinder region and the piston element, is connected to a hydraulic line by at least one bore incorporated in the housing.

5. The hybrid module as claimed in claim 1, wherein the piston element is pre-tensioned in its retracted position by a resetting spring supported on the pressure element.

6. The hybrid module as claimed in claim 1, further comprising two sub-clutches in addition to the disconnect clutch, wherein each of the sub clutches is formed to be oil-cooled and are arranged radially inside a sleeve region of the rotor carrier on which the rotor is received.

7. The hybrid module as claimed in claim 6, wherein a first sub-clutch or a second sub-clutch of the two sub-clutches is actuated via a rotary transmission leadthrough.

8. The hybrid module as claimed in claim 6, wherein the two sub-clutches are arranged radially outside the disconnect clutch.

9. The hybrid module as claimed in claim 6, wherein the two sub-clutches are radially aligned with one another.

10. A drive train for a motor vehicle, having a hybrid module as claimed in claim 1.

11. The hybrid module as claimed in claim 1, further comprising a bearing supported on a radially outer surface of the housing and on a radially inner surface of the clutch component.

12. The hybrid module as claimed in claim 1, wherein the pressure element includes an axially extending section configured to extend through an opening of the clutch component such that the pressure element is non-displaceably coupled to one of the friction elements.

* * * * *